(No Model.)
P. JACOBUS.
CROSSCUT SAW.
No. 377,521. Patented Feb. 7, 1888.
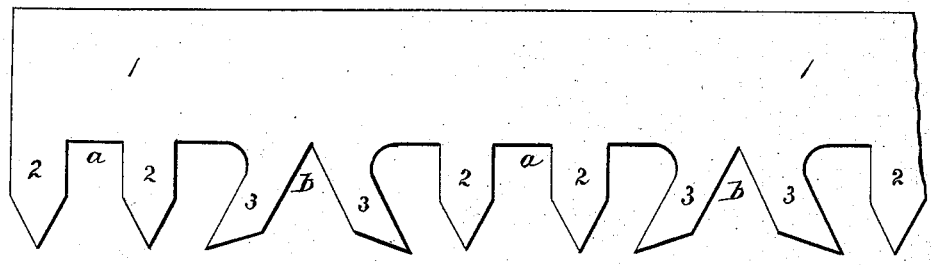
Witnesses
James Woodruff
William P. Goodman
Inventor,
Pierson Jacobus

UNITED STATES PATENT OFFICE.

PIERSON JACOBUS, OF VARICK, NEW YORK.

CROSSCUT-SAW.

SPECIFICATION forming part of Letters Patent No. 377,521, dated February 7, 1888.

Application filed June 22, 1887. Serial No. 242,169. (No model.)

*To all whom it may concern:*

Be it known that I, PIERSON JACOBUS, of the town of Varick, county of Seneca, and State of New York, have invented a new Improvement in Crosscut-Saws; and I hereby declare that the following is a full and exact description of the same, reference being had to the accompanying drawing, which represents a side view of a saw embodying my invention.

1 represents part or section of saw; 2, the fleams or cutting teeth, that are made of the same width down to base, terminating at right angles, leaving space $a$ between them, the object being to keep any desired bevel on tooth with much less filing.

3 represents the double slanting chisels, which are in a slanting position, standing in opposite directions, and alternate with the fleams, and are also separated by space $b$, extending down to base of the same, leaving them separated. The object of the slanting chisel is to plane out the shavings after each set of fleams faster and more easily, and being in that position do not slide over, but take out all the fleams cut, and are very easily filed.

Having thus described my invention, what I claim as new, and desire to secure by Letters Patent, is—

A crosscut-saw having cutting-teeth, in combination with cleaning or chisel teeth, the chisels being arranged in pairs, the two teeth of each pair slanting in opposite directions, and the side edges of each chisel-tooth being straight and parallel, substantially as shown, and for the purpose specified.

PIERSON JACOBUS.

Witnesses:
WILLIAM P. GOODMAN,
JAMES WOODRUFF.